US011122729B2

United States Patent
Dillon (10) Patent No.: US 11,122,729 B2
(45) Date of Patent: Sep. 21, 2021

(54) FURROW OPENER SHANK WITH SPOKED WHEEL

(71) Applicant: Peter Dillon, Virden (CA)

(72) Inventor: Peter Dillon, Virden (CA)

( * ) Notice: Subject to any disclaimer, the term of this patent is extended or adjusted under 35 U.S.C. 154(b) by 274 days.

(21) Appl. No.: 16/331,873

(22) PCT Filed: Sep. 7, 2017

(86) PCT No.: PCT/CA2017/051051
§ 371 (c)(1),
(2) Date: Mar. 8, 2019

(87) PCT Pub. No.: WO2018/045462
PCT Pub. Date: Mar. 15, 2018

(65) Prior Publication Data
US 2019/0373802 A1 Dec. 12, 2019

(30) Foreign Application Priority Data
Sep. 9, 2016 (CA) .................. CA 2941290

(51) Int. Cl.
A01C 7/00 (2006.01)
A01B 19/10 (2006.01)
(Continued)

(52) U.S. Cl.
CPC ............ *A01C 7/006* (2013.01); *A01B 19/10* (2013.01); *A01C 5/062* (2013.01); *A01C 5/068* (2013.01);
(Continued)

(58) Field of Classification Search
CPC ......... A01C 5/062; A01C 5/064; A01C 7/006; A01C 7/08; A01C 7/203; A01C 7/205; A01B 19/10
See application file for complete search history.

(56) References Cited

U.S. PATENT DOCUMENTS 5,333,559 A 8/1994 Hodapp et al.
5,477,792 A 12/1995 Bassett et al.
(Continued)

FOREIGN PATENT DOCUMENTS

CA 2371582 A1 6/2002
CA 2629476 A1 10/2009
(Continued)

OTHER PUBLICATIONS

International Search Report and Written Opinion for Application No. PCT/CA2017/051051, dated Dec. 12, 2017 (8 pgs).

*Primary Examiner* — Jamie L McGowan
(74) *Attorney, Agent, or Firm* — Patterson Thuente Pedersen, P.A.

(57) ABSTRACT

A seeding implement has an implement frame with a lateral frame member. Spoked wheels rotate about a wheel axis that is fixed with respect to the implement frame. Shanks are mounted to the lateral frame member such that each shank is movable with respect to the frame. Each spoked wheel rotates about the wheel axis in a plane that is vertical, aligned with, and forward of, a front face of a corresponding shank, and ends of spokes pass adjacent to a front face of the shank. A spoke clearance distance between the ends of the spokes and the front face of the corresponding shank remains within a trash clearing range as the shank moves with respect to the implement frame from a first operating position to a second operating position that is below the first operating position.

8 Claims, 6 Drawing Sheets

(51) Int. Cl.
A01C 5/06 (2006.01)
A01C 7/08 (2006.01)
A01C 7/20 (2006.01)

(52) U.S. Cl.
CPC ............... *A01C 7/08* (2013.01); *A01C 7/203* (2013.01); *A01C 7/205* (2013.01)

(56) References Cited

U.S. PATENT DOCUMENTS

| | | | |
|---|---|---|---|
| 5,520,125 A | 5/1996 | Thompson et al. | |
| 5,666,892 A * | 9/1997 | Tortella | A01C 5/068 111/52 |
| 5,878,678 A | 3/1999 | Stephens et al. | |
| 6,325,156 B1 | 12/2001 | Barry | |
| 6,408,772 B1 * | 6/2002 | Lempriere | A01C 7/006 111/123 |
| 6,425,445 B1 * | 7/2002 | Tarver, III | A01B 13/08 172/166 |
| 7,104,205 B2 | 9/2006 | Beaujot | |
| 7,159,523 B2 | 1/2007 | Bourgault et al. | |
| 7,261,048 B1 * | 8/2007 | Hantke | A01B 63/32 111/136 |
| 7,574,969 B1 | 8/2009 | Henry et al. | |
| 8,393,407 B2 | 3/2013 | Freed | |
| 8,408,324 B2 * | 4/2013 | Dillon | A01C 7/006 172/45 |
| 10,806,069 B2 * | 10/2020 | Beaujot | A01B 49/06 |
| 2002/0174813 A1 | 11/2002 | Hagny | |
| 2013/0192855 A1 * | 8/2013 | Meek | A01C 7/006 172/146 |
| 2018/0042170 A1 * | 2/2018 | Kovach | A01B 35/28 |
| 2018/0098484 A1 * | 4/2018 | Beaujot | A01B 49/06 |
| 2019/0357417 A1 * | 11/2019 | Chahley | A01B 63/166 |
| 2019/0373802 A1 * | 12/2019 | Dillon | A01C 7/006 |
| 2020/0084950 A1 * | 3/2020 | Peterson | A01C 5/064 |
| 2020/0236839 A1 * | 7/2020 | Hu | A01C 7/006 |

FOREIGN PATENT DOCUMENTS

| | | |
|---|---|---|
| CA | 2695738 | 6/2010 |
| CA | 2889850 A1 | 10/2016 |

\* cited by examiner

FURROW OPENER SHANK WITH SPOKED WHEEL

This application is a national phase application under 35 U.S.C. § 371 of International Application No. PCT/CA2017/051051 filed on Sep. 7, 2017 which claims the benefit of Canadian Patent Application No. 2941290 filed on Sep. 9, 2016, the contents of both of which are incorporated herein by reference in their entirety.

This disclosure relates to the field of agricultural seeding implements and in particular a mounting system for a furrow opener shank and spoked residue clearing wheel.

BACKGROUND

Agricultural seeders are used to place seed and fertilizer in the soil to plant a crop. It is necessary to place the seed at a substantially consistent depth beneath the surface of the soil. Shanks of various configurations typically extend downward from the seeder frame and a furrow opener is mounted on the shank and adapted to engage the soil to make a furrow into which particles of seed or fertilizer are deposited. Typically the furrow opener pushes soil to one or both sides and the particles are deposited close behind the furrow opener so that the pushed aside soil can then fall back in on top of the particles. Where the particles are seeds, a packer wheel is typically provided following the furrow opener and oriented to roll over the furrow to pack the soil that has fallen back over the seeds and encourage seed germination.

The depth at which seeds are placed by the furrow opener is important, while with fertilizer the depth is not so critical. The desired seed depth is typically relatively shallow, from less than one inch with some seeds and soil conditions up to three inches or more in others. Since agricultural seeders are commonly 60 or more feet wide and can include 60 or more individual seed furrow openers, consistently maintaining seed depth for each furrow opener is challenging.

In order to maintain consistent seed depth, it is known to pivotally attach the front end of a trailing arm to the seeder frame such that same extends generally rearward and downward from the frame and can pivot up and down with respect to the seeder frame. A packer wheel is then rotatably attached to support the rear end of the trailing arm. A shank with a seed furrow opener on the bottom end thereof is attached to the trailing arm ahead of the packer wheel such that the vertical position of the bottom of the seed furrow opener with respect to the bottom of the packer wheel can be fixed at a desired location to set the depth of the seed furrow. A bias element is provided to exert a downward force on the trailing arm to engage the seed furrow opener in the soil and force the packer wheel against the ground. The furrow opener assemblies are spaced laterally along the width of the implement by pivotally mounting the front ends of the trailing arms to lateral frame members of the implement.

The packer wheel pushes down the soil over the seed in the seed furrow and the bottom of the packer wheel corresponds to the packed soil surface. The depth of the seed furrow is substantially determined by the vertical distance that the bottom end of the seed furrow opener extends below the bottom of the packer wheel. Such a trailing arm seed furrow opener assembly where two furrow openers are attached to the arm is disclosed in U.S. Pat. No. 7,104,205 to Beaujot.

A problem occurs with trailing arm furrow opener assemblies such as that of Beaujot in uneven terrain where the distance between the frame and the ground varies. As the vertical distance of the frame above the ground varies the trailing arm moves up and down about its pivotal attachment to the seeder frame and the angle of the trailing arm and furrow opener changes and the actual depth of the seed furrow varies. It is therefore well known to provide a trailing arm that includes upper and lower parallel links configured to maintain the furrow opener and packer wheel at substantially constant vertical positions with respect to each other as the trailing arm moves up and down.

U.S. Pat. No. 7,159,523 to Bourgault et al. discloses both a conventional trailing arm furrow opener assembly and one with a parallel linkage. Parallel link systems are now well known in the seeder industry as disclosed for example in U.S. Pat. No. 7,574,969 to Henry, U.S. Pat. No. 7,261,048 to Hantke, U.S. Pat. No. 6,325,156 to Barry, U.S. Pat. No. 5,333,559 to Hodapp et al., and U.S. Pat. No. 5,520,125 to Thompson.

A common problem with such seeding implements is the crop residue that lies on the field surface after a crop is harvested. Historically such residue was buried with discs or like implements before the next crop was seeded but in recent agricultural operations it is common to leave this crop residue undisturbed, or perhaps spread with harrows or the like, however there can be considerable residue left on a field surface when the next crop is planted. This crop residue typically includes long plant straws which accumulate on the shanks above the furrow opener.

Various devices have been developed for the purpose of preventing crop residue from accumulating on the shanks, for example as disclosed in U.S. Pat. No. 5,477,792 Bassett, et al. and U.S. Pat. No. 8,393,407 to Freed. U.S. Pat. No. 8,408,324 to the present inventor Dillon discloses a rotating spoked wheel with ends of the spokes passing along the face of the shank to remove the residue as it accumulates.

SUMMARY OF THE INVENTION

The present disclosure provides a mounting system for a furrow opener shank that overcomes problems in the prior art.

The present disclosure provides a seeding implement apparatus configured for travel over the ground in an operating travel direction, the apparatus comprising an implement frame with a lateral frame member. A plurality of spoked wheels is attached to a drive shaft, the drive shaft rotatably attached to the implement frame about a wheel axis that is substantially fixed with respect to the implement frame and oriented substantially horizontally and perpendicular to the operating travel direction. A drive is operative to rotate the drive shaft and spoked wheels. A plurality of shanks is mounted to the lateral frame member with a furrow opener on a bottom end of each shank. The shanks are mounted to the lateral frame member such that each shank is movable with respect to the implement frame, and a packer wheel is rotatably attached to a rear side of each shank and configured to roll along a furrow formed by the corresponding furrow opener. Each spoked wheel rotates about the wheel axis in a plane that is substantially vertical and aligned with, and forward of, a front face of a corresponding shank, and ends of spokes of each spoked wheel pass adjacent to a front face of the corresponding shank. A spoke clearance distance between the ends of the spokes of each spoked wheel and the front face of the corresponding shank remains within a trash clearing range as the shank moves with respect to the implement frame from a first operating position to a second operating position that is below the first operating position. The trash clearing range is selected such that the spokes contact residue hanging on the shank and prevent the accumulation of residue on the shank In the apparatus of the present disclosure the face of the shank is maintained at a substantially constant distance from the ends of the rotating spokes on the spoked wheel as the shank moves up and down with respect to the implement frame and the spoked wheel. Thus when the furrow opener and shank are in a typical operating position, the ends of the spokes are within a spoke clearance distance from the face of the shank, where same can contact residue as same gathers on the front face of the shank and clear the residue off the shank.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
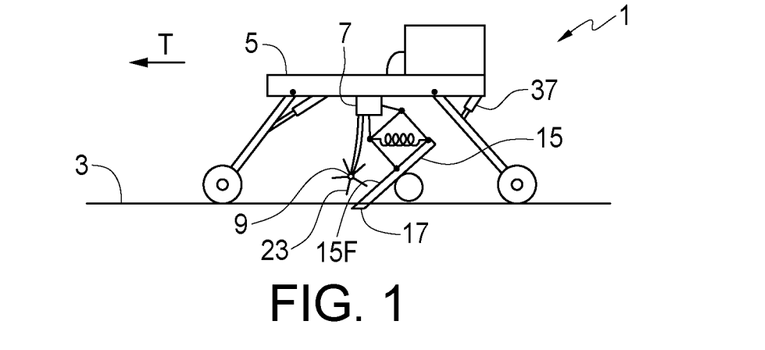
FIG. 1 is a schematic side view of an embodiment of the seeding implement apparatus of the present disclosure with the implement frame shown in the lowered operating position.
Figure 2:
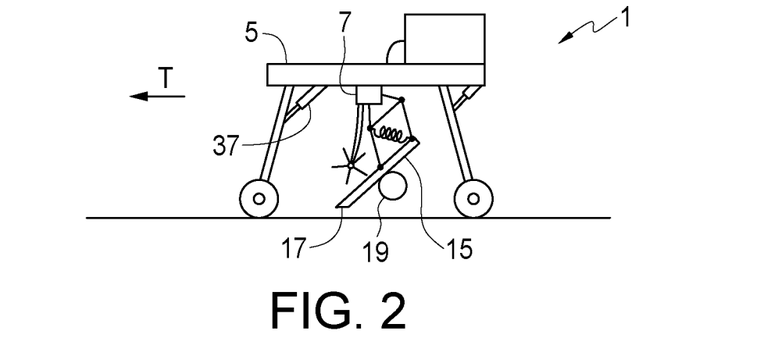
FIG. 2 is a schematic side view of an embodiment of FIG. 1 with the implement frame shown in the raised transport position.
Figure 3:
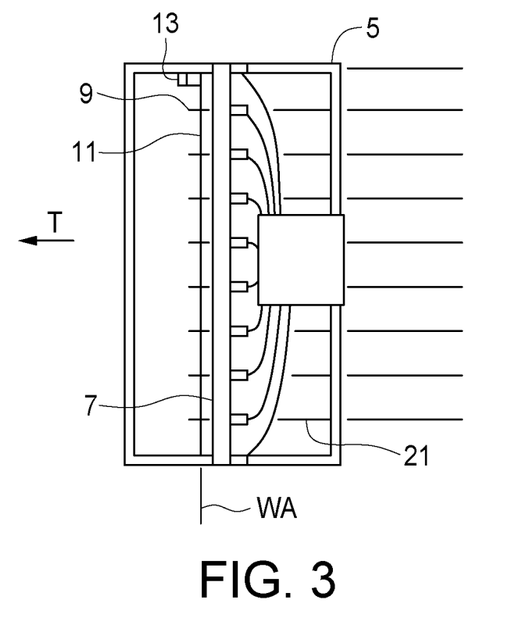
FIG. 3 is a schematic top view of the embodiment of FIG. 1.

FIGS. 1-3 schematically illustrate an embodiment of a seeding implement apparatus 1 of the present disclosure configured for travel over the ground 3 in an operating travel direction t. The apparatus 1 comprises an implement frame 5 comprising a lateral frame member 7. A plurality of spoked wheels 9 are attached to a drive shaft 11 and the drive shaft 11 is rotatably attached to the implement frame 5 about a wheel axis WA that is substantially fixed with respect to the implement frame 5 and oriented substantially horizontally and perpendicular to the operating travel direction T A drive 13 is operative to rotate the drive shaft 11 and spoked wheels 9.

A plurality of shanks 15 is mounted to the lateral frame member 7 and a furrow opener 17 is mounted on a bottom end of each shank 15. The shanks 15 are mounted to the lateral frame member 7 such that each shank 15 is movable with respect to the implement frame 5, as shown more clearly in FIGS. 4-6. A packer wheel 19 is rotatably attached to a rear side of each shank 15 and is configured to roll along a furrow 21 formed by the corresponding furrow opener 17.

Figure 4:
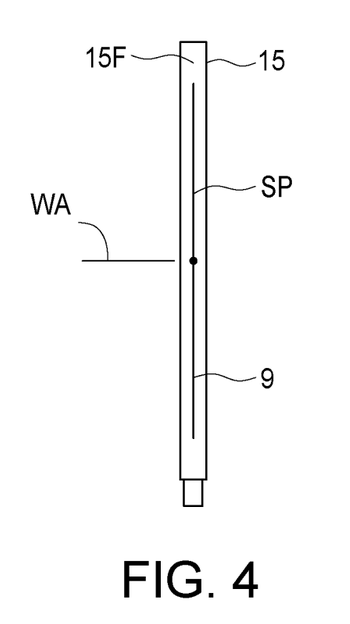
FIG. 4 is a schematic front view showing relative positions of the front face of a shank and the corresponding spoked wheel.

Each spoked wheel 9 rotates about the wheel axis WA in a plane SP that is substantially vertical and aligned with, and forward of, the front face 15F of the corresponding shank 15 as schematically illustrated in FIG. 4, and ends of spokes 23 of each spoked wheel 9 pass adjacent to a front face 15F of the corresponding shank 15.

Figure 5:
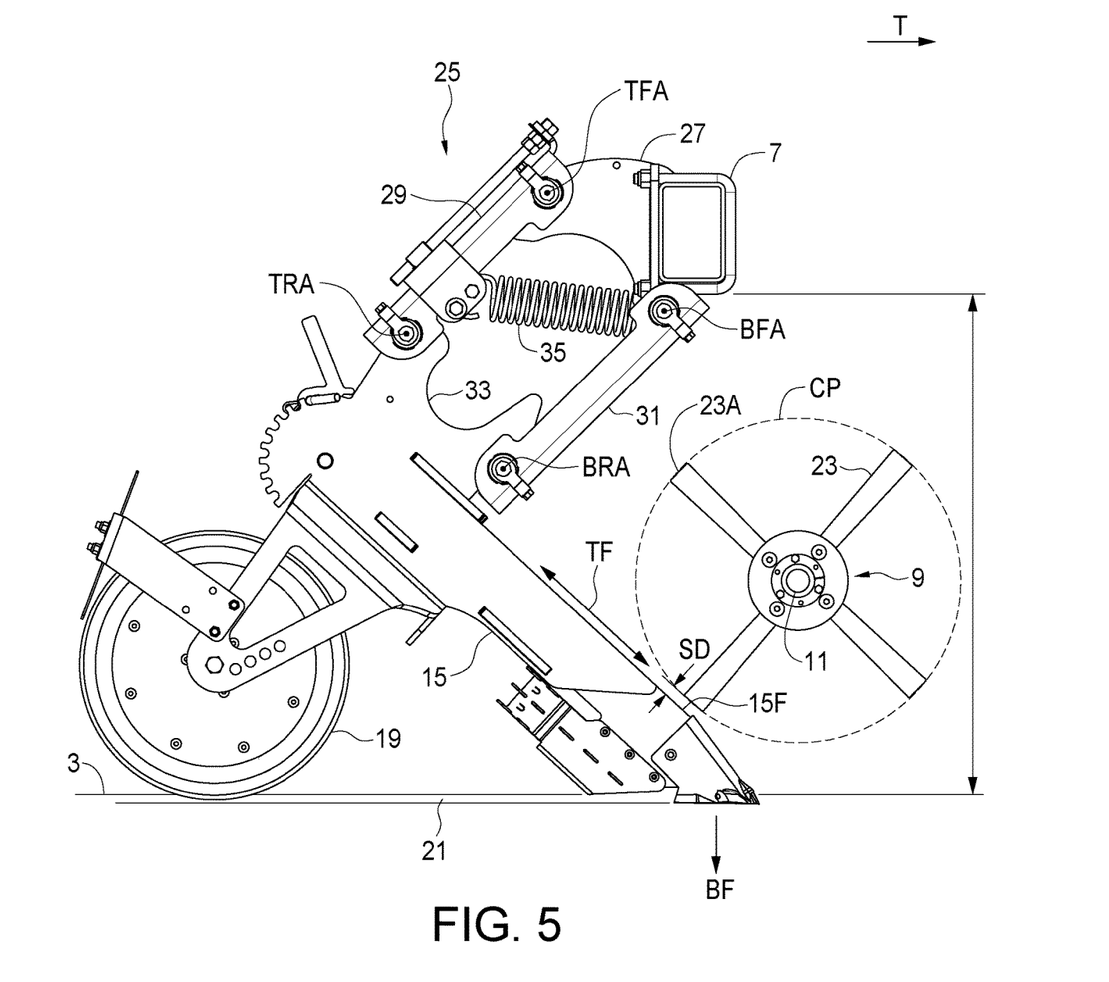
FIG. 5 is side view of the spoked wheel and link assembly of the embodiment of FIG. 1 in a first operating position.
Figure 6:
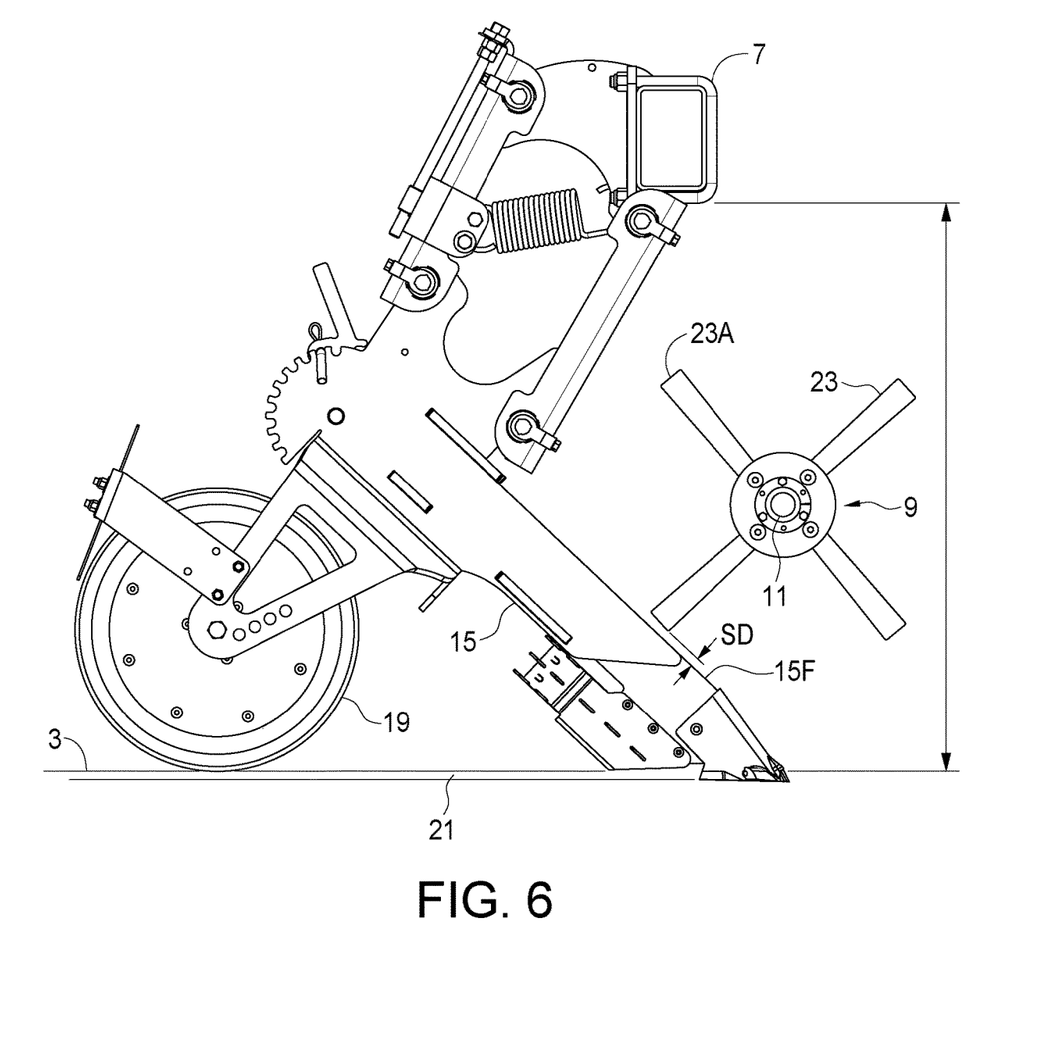
FIG. 6 is side view of the spoked wheel and link assembly of the embodiment of FIG. 1 in a second lower operating position.

As shown in FIGS. 5 and 6, a spoke clearance distance SD between the ends 23A of the spokes 23 of each spoked wheel 9 and the front face 15F of the corresponding shank 15 remains nearly constant and within a trash clearing range as the shank 15 moves with respect to the implement frame and lateral frame member 7 thereof from a first operating position shown in FIG. 5 to a second operating position FIG. 6 that is below the first operating position. The trash clearing range is close enough to the face 15F of the shank to prevent the accumulation of residue on the shank 15. Typically the trash clearing range is between about zero and about one and one half inches.

Each furrow opener 17 is engaged in the ground 3 and moves downward and forward with respect to the implement frame 5 as the corresponding shank 15 moves from the first operating position of FIG. 5 where the lateral frame member 7 is a first height above the ground 3, to the second operating position of FIG. 6 where the lateral frame member 7 is a second greater height above the ground 3. In the illustrated apparatus the front face 15F of each shank 15 is substantially straight and moves substantially tangentially to a circular path CP of the ends 23A of the spokes 23 of the spoked wheel 9 along line TF.

In the illustrated apparatus 1, each shank 15 is mounted to the lateral frame member 7 by a link assembly 25 comprising a front link 27 attached to the lateral frame member 7 in a fixed orientation. A top arm 29 is pivotally attached at a front end thereof to the front link 27 about a top front pivot axis TFA oriented substantially perpendicular to the operating travel direction T, and a bottom arm 31 is pivotally attached at a front end thereof to the front link 27 about a bottom front pivot axis BFA oriented substantially parallel to the top front pivot axis TFA. A rear link 33 is pivotally attached to a rear end of the top arm 29 about a top rear pivot axis TRA oriented substantially parallel to the top front pivot axis TFA, and pivotally attached to a rear end of the bottom arm 31 about a bottom rear pivot axis BRA oriented substantially parallel to the top front pivot axis TFA. The illustrated top arm 29 is slightly shorter than the bottom arm 31.

The shank 15 is attached to the rear link 33. A bias element, illustrated as a spring 35, is operative to exert a downward bias force BF on each link assembly 25. When each shank 15 is between the first and second operating positions, the top and bottom arms 29, 31 of the corresponding link assembly 25 are oriented at an angle between about 45-65 degrees downward from horizontal.

The illustrated link assembly 25 moves the shank generally along line TF, tangential to the circular path CP of the ends 23A of the spokes 23 such that the spoke clearance distance SD stays generally constant. It is contemplated that in most circumstances of terrain changes during seeding operations the shank 15, and correspondingly the link assembly 25, will be near to or between the first and second positions illustrated in FIGS. 5 and 6.

It is further contemplated that other link assemblies with top and bottom arms of various lengths and oriented at various angles could also be configured to maintain the spoke clearance distance SD within the desired trash clearing range.

Figure 7:
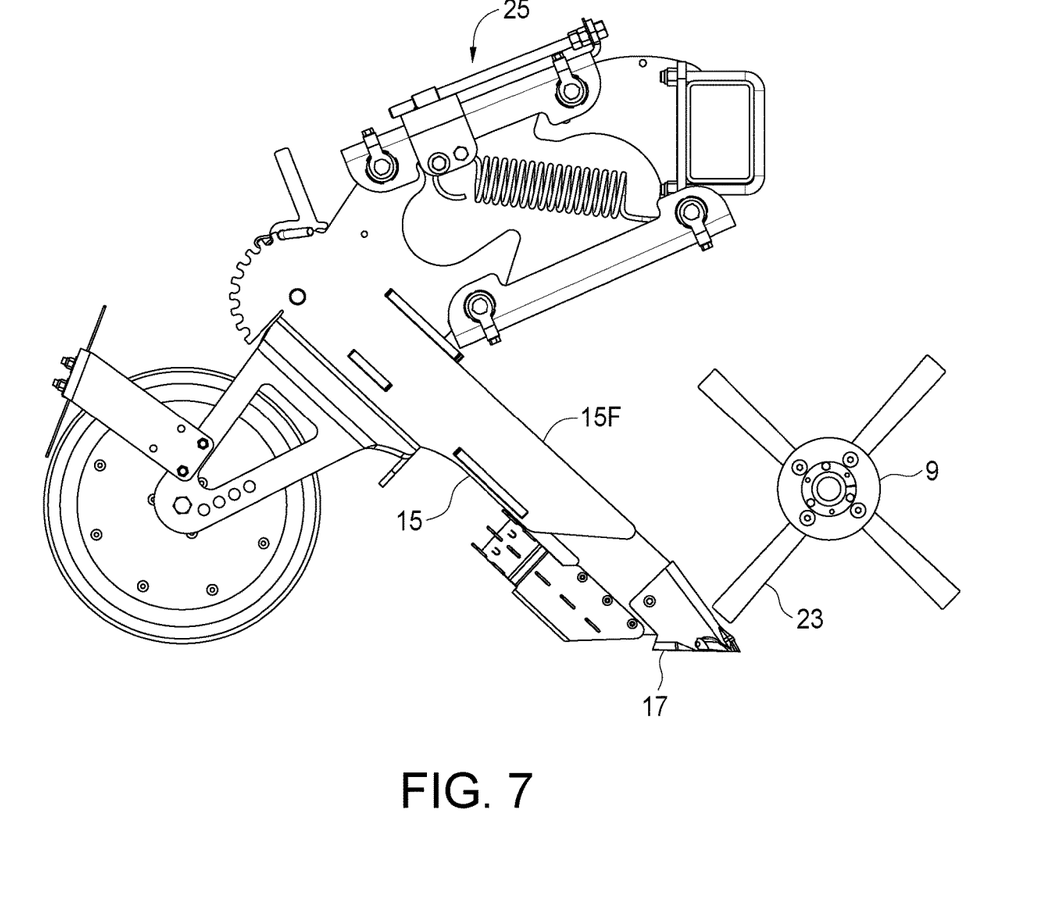
FIG. 7 is side view of the spoked wheel and link assembly of the embodiment of FIG. 1 in a raised obstruction clearing position.

FIG. 7 illustrates the shank 15 in a highly raised position out of the normal operating range, such as would be found when clearing an obstruction in the field such as a stone. The furrow opener 17 bends down somewhat and is shaped to avoid contacting the ends of the spokes 23 when in this position.

Figure 8:
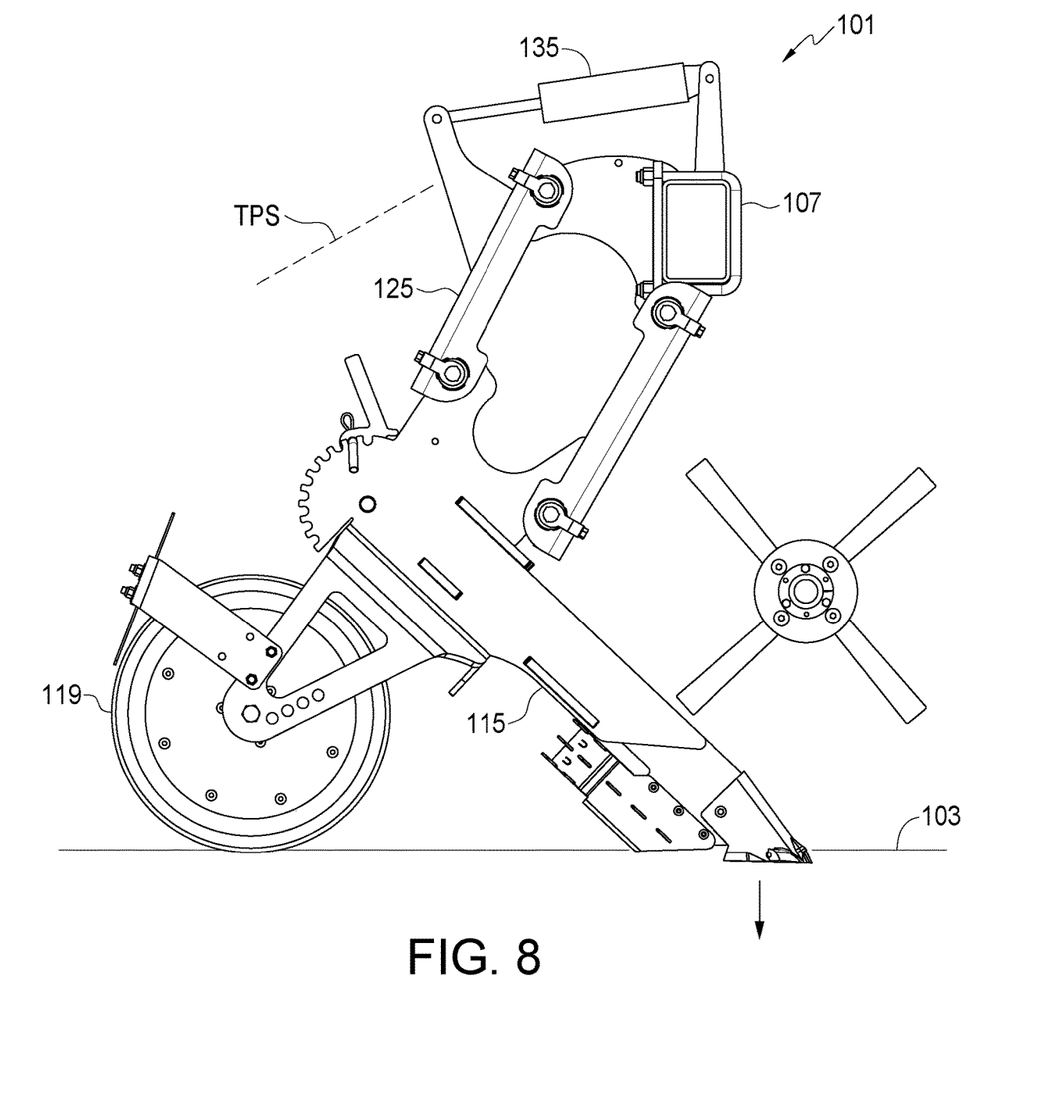
FIG. 8 is a schematic side view of an alternate shank mounting assembly where the bias element is provided by a hydraulic cylinder.

FIG. 8 schematically illustrates an alternate seeding implement apparatus 101 where the bias element is provided by a hydraulic cylinder 135 that is operative to exert a downward bias force BF on the link assembly 125 and also is operative to raise the link assembly 125, and attached shank 115 and packer wheel 119 to a transport position TPS where the furrow openers 117 are above the ground 103.

In the apparatus 1 where the bias element is provided by the spring 35, a vertical position control, provided by hydraulic cylinders 37 shown in FIGS. 1 and 2 is operative to move the implement frame 5 between the raised transport position shown in FIG. 2, where the furrow openers 17 are above the ground, and the lowered operating position shown in FIG. 1 where the furrow openers 17 are engaged in the ground 3.

Figure 9:
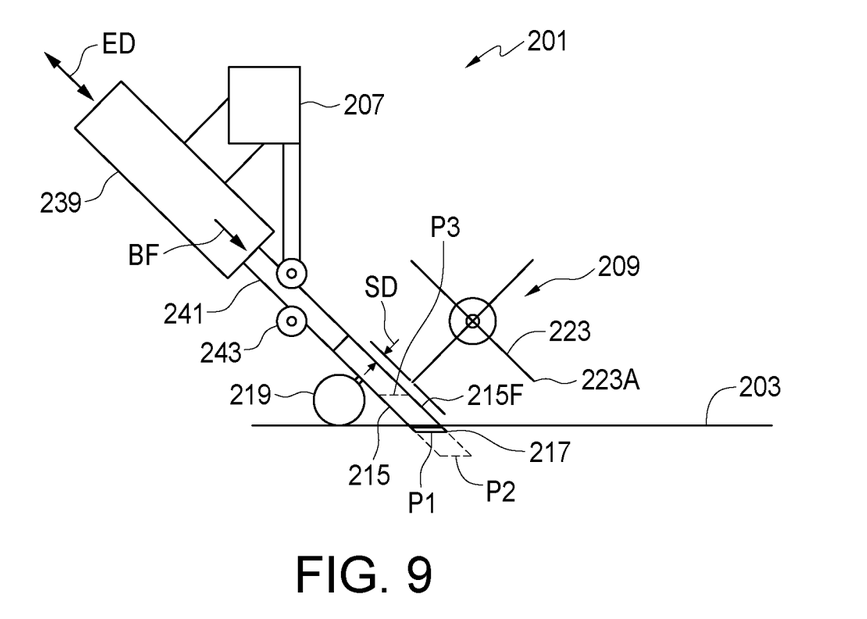
FIG. 9 is a schematic side view of a further alternate shank mounting assembly where the shank is an extension of a hydraulic cylinder rod.
Figure 10:
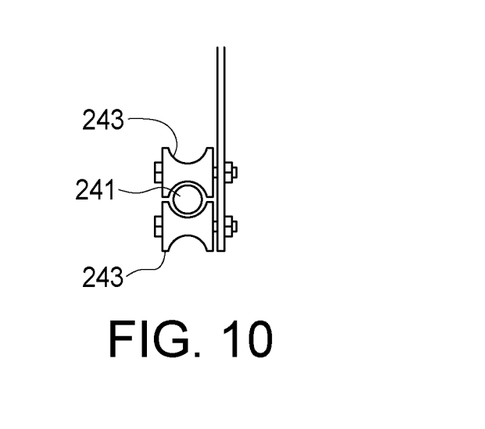
FIG. 10 is a schematic sectional view of the guide wheels of the shank mounting assembly of FIG. 9.

A further alternate apparatus 201 is schematically illustrated in FIGS. 9 and 10 comprising a plurality of extendable bias elements, illustrated as hydraulic cylinders 239 attached to the lateral frame member 207. The shank 215 is attached to the rod 241 of the hydraulic cylinder 239 and configured such that the front face 215F thereof is substantially aligned with an extension direction ED of the hydraulic cylinder 239. The hydraulic cylinder 239 is connected to an active hydraulic fluid source as is known in the art where hydraulic fluid at a selected pressure is directed into the hydraulic cylinder 239 to exert a bias force BF on the shank 215 in the extension direction ED, and the hydraulic fluid moves in and out in response to greater or lesser forces exerted on the rod 241. The bias force BF urges the furrow opener 217 from the first operating position P1 toward a second lower operating position P2.

Guide wheels 243 are configured to support each shank 215 in the illustrated operating orientation where the front face 215F thereof is substantially aligned with the extension direction ED of the hydraulic cylinder 239. The packer wheel 219 is fixed to the shank 215 at a selected location to determine the depth of penetration of the furrow opener 217 into the ground 203. In the apparatus 201 the front face 215F of the shank 215 moves in a straight line in direction ED tangential to the circular path of the ends 223A of the spokes 223 of the spoked wheel 209 such that the spoke clearance distance SD between the ends 223A of the spokes 223 and the front face 215F of the corresponding shank 215 is constant as the shank moves from operating position P1 to operating position P2.

The hydraulic cylinder 239 is further conveniently operative to raise the corresponding shank 215 to a transport position P3 where the corresponding furrow opener 217 is above the ground 203.

In the apparatus of the present disclosure the front face 15F of the shank 15 is maintained at a substantially constant distance from the ends 23A of the rotating spokes 23 on the spoked wheel 9 as the shank 15 moves up and down with respect to the implement frame 5 and the spoked wheel 9 as terrain changes during typical field operations. Thus when the furrow opener 17 and shank 15 are in a typical operating position such as illustrated in FIGS. 5 and 6, the ends 23A of the spokes 23 are maintained at a spoke clearance distance SD from the face 15F of the shank 15 that is within the desired trash clearing range of zero to about one and one half inches where same can contact residue as residue gathers on the front face 15F of the shank 15 and clear the residue off the shank 15.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A seeding implement apparatus configured for travel over the ground in an operating travel direction, the apparatus comprising:

an implement frame comprising a lateral frame member;

a plurality of spoked wheels attached to a drive shaft, the drive shaft rotatably attached to the implement frame about a wheel axis that is substantially fixed with respect to the implement frame and oriented substantially horizontally and perpendicular to the operating travel direction, and a drive operative to rotate the drive shaft and spoked wheels;

a plurality of shanks mounted to the lateral frame member and a furrow opener on a bottom end of each shank;

wherein the shanks are mounted to the lateral frame member such that each shank is movable with respect to the implement frame;

a packer wheel rotatably attached to a rear side of each shank and configured to roll along a furrow formed by the corresponding furrow opener;

wherein each spoked wheel rotates about the wheel axis in a plane that is substantially vertical and aligned with, and forward of, a front face of a corresponding shank, and wherein ends of spokes of each spoked wheel pass adjacent to a front face of the corresponding shank;

wherein a spoke clearance distance between the ends of the spokes of each spoked wheel and the front face of the corresponding shank remains within a trash clearing range as the shank moves with respect to the implement frame from a first operating position to a second operating position that is below the first operating position;

wherein the trash clearing range is selected such that the spokes contact residue hanging on the shank and prevent the accumulation of residue on the shank, wherein each furrow opener is engaged in the ground and moves downward and forward with respect to the implement frame as the corresponding shank moves from the first operating position to the second operating position;

wherein the front face of each shank is substantially straight and moves substantially tangentially to a circular path of the ends of the spokes of the spoked wheel; and comprising a plurality of extendable bias elements attached to the lateral frame member, and wherein each shank is attached to a corresponding bias element and configured such that the front face thereof is substantially aligned with an extension direction of the corresponding bias element, and wherein each bias element exerts a bias force on the corresponding shank towards the second operating position.

2. The apparatus of claim 1 wherein the trash clearing range is between about zero and about one and one half inches.

3. The apparatus of claim 1 wherein each shank is mounted to the lateral frame member by a link assembly comprising:
   a front link attached to the lateral frame member in a fixed orientation;
   a top arm pivotally attached at a front end thereof to the front link about a top front pivot axis oriented substantially perpendicular to the operating travel direction;
   a bottom arm pivotally attached at a front end thereof to the front link about a bottom front pivot axis oriented substantially parallel to the top front pivot axis;
   a rear link pivotally attached to a rear end of the top arm about a top rear pivot axis oriented substantially parallel to the top front pivot axis, and pivotally attached to a rear end of the bottom arm about a bottom rear pivot axis oriented substantially parallel to the top front pivot axis;
   wherein the shank is attached to the rear link;
   the apparatus comprising a plurality of bias elements, each bias element operative to exert a downward bias force on a corresponding link assembly.

4. The apparatus of claim 3 wherein the top arm is shorter than the bottom arm.

5. The apparatus of claim 3 wherein the bias element comprises a hydraulic cylinder operative to raise the link assembly to a transport position where the furrow openers are above the ground.

6. The apparatus of claim 1 comprising a vertical position control operative to move the implement frame between a raised transport position, where the furrow openers are above the ground, and a lowered operating position where the furrow openers are engaged in the ground.

7. The apparatus of claim 1 comprising at least one guide wheel configured to support each shank in an operating orientation where the front face thereof is substantially aligned with the extension direction of the corresponding bias element.

8. The apparatus of claim 1 wherein each bias element is provided by a hydraulic cylinder operative to raise the corresponding shank to a transport position where the corresponding furrow opener is above the ground.

* * * * *